United States Patent Office 3,053,874
Patented Sept. 11, 1962

3,053,874
PROCESS FOR THE PRODUCTION OF CYANOALKYLFLUOROSILANE
Enrico J. Pepe, Kenmore, and Bernard Kanner, Tonawanda, N.Y., assignors to Union Carbide Corporation, a corporation of New York
No Drawing. Filed Dec. 21, 1959, Ser. No. 860,685
18 Claims. (Cl. 260—448.2)

This invention relates to a process for producing cyanoalkylsilanes. More particularly, this invention is concerned with a process for the production of cyanoalkylsilanes containing at least one fluorine radical bonded to the silicon atom thereof.

The process of the instant invention can be carried out by forming a reactive mixture of a metal cyanide, such as an alkali or alkaline earth metal cyanide, with a haloalkylfluorosilane such as a chloroalkylfluorosilane. The reaction that takes place in a metathesis and may be graphically represented by the following general equation which depicts, for the purpose of illustration, the reaction of sodium cyanide with gamma-chloroisobutyltrifluorosilane:

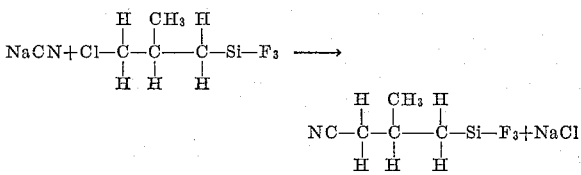

It is an essential feature of our invention that the haloalkylfluorosilanes which we employ as one of our starting materials be free of halogen substitution on the beta carbon atom of the haloalkyl group. According to our experience, a beta-haloalkylfluorosilane does not react with a metal cyanide to replace the halogen on the beta carbon atom with a cyano group.

The haloalkylfluorosilanes free of halogen substitution on the beta carbon atom of the haloalkyl group which we prefer to employ in the practice of our invention are the chloroalkylfluorosilanes. While the invention is hereinafter fully described with respect to the use of such chloroalkylfluorosilanes as starting materials therefor, it is to be understood that other haloalkylfluorosilanes as for example bromoalkyl- and iodoalkylfluorosilanes can be employed with good results. It is also to be understood that for the purpose of describing our invention our preferred starting materials, the chloroalkylfluorosilanes are free of chlorine substitution on the beta carbon atom of the chloroalkyl group. In a like manner, the compounds produced by the process of our invention, the cyanoalkylfluorosilanes are free of cyano substitution on the beta carbon atom of the cyanoalkyl group.

The chloroalkylfluorosilane starting materials suitable for use in the process of the invention may be graphically represented by the following formula:

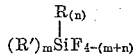

where R′ represents a chloroalkyl group free of chlorine substitution on the beta carbon atom of the group, R represents a monovalent hydrocarbon group, as for example, an alkyl group, an alkenyl group, a cycloalkyl group, an alkaryl group, an aralkyl group or an aryl group, n is a whole number having a value of from 0 to 2, m is an integer having a value of from 1 to 3 with the sum of m and n not being less than 1 nor more than 3. The chloroalkyl groups free of chlorine substitution on the beta carbon atom of the group, which R′ represents include the monochloroalkyl groups as well as the polychloroalkyl groups such as the dichloroalkyl, the trichloroalkyl and the like. Illustrative of the monochloroalkyl groups which R′ represents are the alpha-chloroalkyl groups which include chloromethyl, alpha-chloroethyl, alpha-chloropropyl, alpha-chlorobutyl, alpha-chloropentyl and the like; the gamma-chloroalkyl groups which include gamma-chloropropyl, gamma-chlorobutyl, gamma-chloroisobutyl, gamma-chloropentyl, gamma-chlorohexyl and the like; the delta-chloroalkyl groups which include delta-chloroheptyl and the like; the epsilon-chloroalkyl groups which include epsilon-chloropentyl, epsilon-chlorohexyl, epsilon-chloroheptyl and the like. Illustrative of the trichloroalkyl groups which R′ represents are alpha,gamma,gamma-trichloropropyl, gamma - delta,delta - trichlorobutyl, alpha,gamma,delta-trichlorobutyl, gamma,delta,epsilon - trichloropentyl and the like. In the practice of the invention it is preferred that the chloroalkyl group or groups bonded to the silicon atom of the starting silanes contain not more than two chlorine atoms in the group.

The monovalent hydrocarbon groups represented by R include the saturated and unsaturated aliphatic monovalent hydrocarbon groups as well as the aromatic monovalent hydrocarbon groups. Illustrative of the aliphatic monovalent hydrocarbon groups which R represents are the alkyl groups, which include methyl, ethyl, propyl, butyl, pentyl and the like, alkenyl groups such as vinyl, butenyl and the like, and the cycloalkyl groups which include cyclopentyl, cyclohexyl, and the like as well as the alkyl substituted cycloalkyl groups such as methylcyclopentyl, methylcyclohexyl, and the like. Illustrative of the aromatic monovalent hydrocarbon groups which R also represents are the aryl groups such as phenyl, naphthyl and the like as well as the substituted phenyl and naphthyl groups that is the alkaryl groups which include tolyl, ethylphenyl, methyl-naphthyl and the like. Also illustrative of the groups that R represents are the aralkyl groups such as benzyl, phenylethyl and the like.

The metal cyanide starting materials which can be employed to react with a chloroalkylfluorosilane are the ionic metal cyanides of metals of groups I and II of the periodic chart of the elements as for example, the alkali metal and alkaline earth metal cyanides, zinc cyanide, cuprous cyanide, mercuric cyanide and the like. In the practice of the invention it is preferred to employ the alkali metal cyanides such as sodium cyanide, potassium cyanide and the like. Illustrative of the alkaline earth metal cyanides which can be employed in the process of this invention are barium cyanide, calcium cyanide, and the like.

While the reactants, namely the metal cyanide and chloroalkylfluorosilane can be employed in chemically equivalent amounts based on the cyanide and chlorine content of the respective starting materials, it is preferred to employ the metal cyanide in amounts greater than the chemical equivalent. For example, we found it desirable to use from about 1.1 to 4 chemical equivalents of the metal cyanide, based on the cyanide content thereof, per chemical equivalent of the chloroalkylfluorosilane, based on the chlorine content thereof. Amounts of the metal cyanide in excess of the greater ratio set forth above can also be employed, however, no material advantage is obtained thereby.

In the practice of the invention the reaction between a chloroalkylfluorosilane and an ionic metal cyanide is carried out within a highly polar liquid organic compound in which the starting materials are mutually soluble to an extent whereby the two reacting substances are brought into reactive contact. In the absence of such a solvent, the reaction does not appear to take place.

It has been found that the reaction between a chloroalkylfluorosilane and an ionic metal cyanide within a highly polar liquid organic compound is a liquid-solid phase reaction which is driven toward completion when the metal chloride reaction product is less soluble in the highly polar liquid organic compound than the corresponding metal cyanide starting material.

Illustrative of the highly polar organic liquid compounds in which the starting materials are mutually soluble to the extent whereby they are brought into reactive contact, and in which the starting ionic metal cyanides are more soluble than the corresponding metal chloride reaction products, are the highly polar nitrogen-containing organic liquid compounds and the dialkyl ethers of ethylene glycol and polyethylene glycol. Most suitable for use in the process of this invention are those highly polar nitrogen-containing liquid organic compounds commonly known as the dialkyl acylamide compounds which can be graphically depicted by the structural formula:

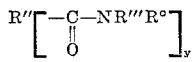

where R″ is hydrogen or a mono-, di- or trivalent, saturated or unsaturated, aliphatic hydrocarbon group and preferably either an alkyl, alkylene or alkenylene group containing from 1 to 5 carbon atoms, R‴ and R° are alkyl groups, preferably methyl, ethyl or propyl groups and $y$ is a numeral having a value of 1, 2 or 3. Illustrative of such compounds are N,N-dimethylformamide, N,N-diethylformamide, N,N-dipropylformamide, N,N-dimethylacetamide, N,N-diethylpropionamide, N,N,N′, N′ - tetramethylmalonamide; N,N,N′,N′ - tetramethyl-alpha-ethylmalonamide, N,N,N′,N′ - tetramethylglutaramide, N,N,N′,N′-tetramethylsuccinamide, N,N,N′,N′-tetramethylfumaramide, N,N,N′,N′-tetramethyllitaconamide. The dialkyl acylamide compounds which it is preferred to employ in the process are the dialkylformamides.

One of the advantages derived from the use of highly polar nitrogen-containing liquid organic compounds as solvents for the reaction lies in the substantial solubility of the metal cyanide starting materials therein as compared to relatively poor solubility of the corresponding metal chloride in the same solvent. Such extreme differences in solubility permit the reaction to be readily driven toward completion. The table below, based on semi-quantitative data is provided to illustrate the substantial differences in the solubility of typical metal cyanide starting materials and their corresponding metal chloride reaction products in highly polar liquid organic nitrogen-containing compound.

| Solubility in N,N-dimethylformamide: | Grams per 100 cc. |
|---|---|
| Potassium cyanide | 0.22 |
| Sodium cyanide | 0.76 |
| Potassium chloride | [1] 0.05 |
| Sodium chloride | [1] 0.05 |

[1] Less than.

In carrying out the process of this invention the amount of solvent employed is not narrowly critical and may vary over wide limits. Preferably, the amount of solvent employed should be sufficient to completely dissolve the chloroalkylfluorosilane starting materials, which for the most part are miscible with the solvent in all proportions. It has been found that amounts of the solvent which vary from about 20 parts to about 100 parts for each 100 parts of the combined weights of the starting materials most suitable. Amounts of the solvent below about 20 parts by weight and above 100 parts by weight may also be employed, however, no commensurate advantage is obtained thereby.

The reaction can be conducted at a temperature which may vary about 0° C. to about 250° C. and above. However, it is desirable to avoid temperatures so high as to favor cleavage of the carbon to silicon bond or bonds of the silane and thus, decrease the yield of the cyanoalkyl product. In the practice of this invention, it is preferred to employ temperatures within the range of from about 25° C. to about 175° C. When carrying out the process in the presence of a solvent it is particularly preferred that the reaction mixture be heated from about 140° C. to about 160° C., over the period of the reaction, so as to obtain a reasonable rate of reaction.

Starting with potassium cyanide and gamma-chloro-isobutyltrifluorosilane, which are illustrative of two of the starting materials, it will be seen from the equation set forth hereinabove, that in a reaction the cyano group of the potassium cyanide will displace the chlorine group of the silane starting material with a consequent formation of cyanopropyltrifluorosilane. In a like manner, when a polychloroalkylfluorosilane is employed as the silane component in the process of this invention the chlorine groups thereof are displaced by cyano groups supplied by the potassium cyanide or other metal cyanide molecules. Obviously, as the reaction proceeds the concentrations of the cyanoalkylfluorosilane product increase from an initial value of zero. Using the solvents described in the process of this invention, potassium chloride precipitates from solution during the course of the reaction and any undissolved potassium cyanide present goes into solution at approximately the same rate at which the potassium chloride precipitates.

As far as is known, the course of the reaction between an ionic metal cyanide and a chloroalkylfluorosilane in the presence of a highly polar liquid organic solvent does not depart from the well established laws or principles applicable to opposing reactions, dynamic equilibrium and equilibrium concentrations. The point of equilibrium in the present reaction is apparently shifted in the direction of the formation of the cyanoalkylfluorosilane products by the precipitation of the alkali or alkaline earth metal chloride which accounts for the increased yields of this process.

The cyanoalkylfluorosilane reaction products are soluble in the highly polar liquid organic nitrogen-containing compounds employed as the preferred solvents in the process. Such cyanoalkylfluorosilanes normally have boiling temperatures different from those of the solvents employed. Therefore, they may be removed from solution by distillation techniques. Obviously, the more efficient the distillation column the better the results, particularly where the boiling points of the desired product and solvent lie close together.

The reaction between an ionic metal cyanide and a chloroalkylfluorosilane in the presence of a highly polar liquid organic nitrogen-containing compound is preferably conducted under substantially anhydrous conditions because of the susceptibility of the cyano group and the group to undergo hydrolysis. However, the presence of some moisture or water will not completely inhibit the reaction or destroy the reactants, although the yield of the desired products is somewhat lowered. In the practice of our process we prefer to employ starting materials which are in a substantially anhydrous state. Thus, if desired, the starting materials may be passed over anhydrous calcium sulfate or heated to reflux temperatures to remove any moisture contained therein.

Iodides such as potassium iodide and sodium iodide can be added to the reaction mixture of this process, if desired. These iodides serve as promoters of the reaction of the haloalkylfluorosilane with the ionic metal cyanide.

The haloalkylfluorosilane starting materials useful in the process of this invention can be prepared by the reaction of the haloalkylchlorosilanes with sodium fluorosilicate ($Na_2SiF_6$) in tetralin. The reaction is conducted by heating the mixture with stirring and removing the haloalkylfluorosilane reacting product by distillation.

The novel cyanoalkylfluorosilanes produced according to the process of this invention are cyanoalkylfluorosilanes of the formula

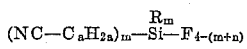
$$(NC-C_aH_{2a})_m-\underset{|}{\overset{R_m}{Si}}-F_{4-(m+n)}$$

wherein R, (m), and (n) have the above defined meanings and (a) is an integer of from 1 to 12, with the provision that the cyano group is separated from the silicon atom by 1 carbon atom or more than 2 carbon atoms (i.e. cyano is not attached to a carbon atom beta to the silicon). Illustrative of the novel cyanoalkylfluorosilanes produced by the process of this invention include the alpha-cyanoalkylfluorosilanes such as alpha-cyanomethyltrifluorosilane, alpha-cyanoethylmethyldifluorosilane, alpha-cyanopropylphenyldifluorosilane, alpha-cyanopentyldibutylfluorosilane and the like; the gamma-cyanoalkylfluorosilanes such as gamma-cyanopropyltrifluorosilane, gamma-cyanoisobutylmethyldifluorosilane, gamma-cyanopentylphenyldifluorosilane and the like; the delta-cyanoalkylfluorosilanes such as delta-cyanobutyltrifluorosilane, delta-cyanopentylmethyldifluorosilane, delta-cyanoheptylphenyldifluorosilane, delta-cyanohexyldiethylfluorosilane and the like; the epsilon-cyanoalkylfluorosilanes such as epsilon-cyanopentylmethyldifluorosilane, epsilon - cyanoheptyldiphenylfluorosilane, epsilon-cyanooctyltrifluorosilane and the like. Also included in the novel cyanoalkylsilanes produced by the process of this invention are the dicyanoalkylfluorosilane such di(gamma-cyanopropyl)difluorosilane, di(gamma-cyanoisobutyl)methylfluorosilane, di(delta-cyanopentyl)difluorosilane and the like; the tri-(cyanoalkyl)flouorosilane such as tri-(gamma-cyanopropyl)fluorosilane, tri(delta-cyanopentyl)fluorosilane and the like.

The cyanoalkylfluorosilanes produced according to the process of this invention are useful in the preparation of carboxyalkylsiloxanes by hydrolysis of the cyano group under acidic or basic condition. The cyanoalkylfluorosilanes unexpectedly are not readily hydrolyzed by water thereby reducing the possibility of polymer production on being in contact for short periods with solvents containing water.

The following examples serve to further illustrate the invention and are not to be construed as limitations thereon.

*Example I*

Sodium cyanide (75 g., 1.5 mol.), potassium iodide (2 g.) and dimethylformamide (200 ml.) were charged into a 3-necked flask fitted with a stirrer, thermometer, a 12-inch Vigreaux column with stillhead and an electric heating mantle. The mixture was heated to reflux for .25 hour to remove any water present. The mixture was then cooled and gamma-chloroisobutylmethyldifluorosilane (180 g., 1.04 mol.) was added. The resultant mixture was then heated to reflux (144 to 160° C.) for two hours. The mixture was then cooled to 35° C., 150 ml. of anhydrous diethylether were added and the solution filtered through anhydrous silica type filter aid to remove the precipitated salts. The etheral solution (filtrate) was evaporated under reduced pressure (about 50 mm. Hg) to remove low boiling materials (such as diethylether, dimethylformamide and the like) and thereafter the residue in the flask was distilled to yield a distillate (B.P. 33° C. at 500 mm. to 50° C. at 1.3 mm. Hg). The distillate was then refractionated at atmospheric pressure through a 12″ x ¾″ column packed with glass helices to yield gamma-cyanoisobutylmethyldifluorosilane

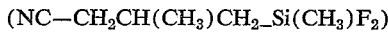
$(NC-CH_2CH(CH_3)CH_2-Si(CH_3)F_2)$ (92 g., B.P., 199.5–200° C. at 750 mm. Hg) which gave the following elemental analysis:

Calculated for $C_6H_9SiNF_2$: 8.1% N; 23.3% F. Found: 7.9% N; 23.0% F.

*Example II*

Sodium cyanide (50 g., 1.0 mol.), potassium iodide (1.0 g.), gamma-chloroisobutylmethyldifluorosilane (125 g., 0.72 mol.) and tetraethyleneglycoldimethylether (150 ml.) were charged into a 3-necked flask fitted with a stirrer, thermometer, water cooled condenser, dropping funnel and an electric heating mantle. The mixture was stirred and heated to reflux (173° C.–195° C.) over a 19 hour period. The mixture was cooled and diluted with diethylether (85 ml.) The mixture was then filtered to remove the insoluble salts. The filtrate was evaporated under reduced pressure (about 150 mm. Hg), to remove low boiling material (such as diethylether and the like) and thereafter the residue in the flask was distilled under reduced pressure to yield gamma-cyanoisobutylmethyl difluorosilane (33 g.) B.P. 45° C. at 1.2 mm. Hg; $n^{25}$ 1.3932.

An attempt to effect a similar reaction employing the corresponding chlorosilane under the same conditions failed to produce the desired reaction.

*Example III*

Gamma-chloropropyltrifluorosilane can be reacted with sodium cyanide according to the procedure given in Example 1 to produce gamma-cyanopropyltrifluorosilane.

*Example IV*

Omega-chloroundecyltrifluorosilane can be reacted with sodium cyanide according to the procedure given in Example 1 to produce omega-cyanoundecyltrifluorosilane.

*Example V*

Delta-chloropentyldimethylfluorosilane can be reacted with sodium cyanide according to the procedure given in Example 1 to produce delta-cyanopentyldimethylfluorosilane.

*Example VI*

Di(gamma-chloroisobutyl)difluorosilane can be reacted with sodium cyanide according to the procedure given in Example 1 to produce di(gamma-cyanoisobutyl)difluorosilane.

*Example VII*

Omega-octadecyltrifluorosilane can be reacted with sodium cyanide according to the procedure given in Example 1 to produce omega-cyanooctadecyltrifluorosilane.

*Example VIII*

Gamma-chloropropyldiphenylfluorosilane can be reacted with sodium cyanide according to the procedure given in Example 1 to produce gamma-cyanopropyldiphenylfluorosilane.

What is claimed is:

1. A process for producing a cyanoalkylfluorosilane which comprises reacting an ionic metal cyanide selected from the class consisting of the ionic metal cyanides of the metals of groups I and II of the periodic chart and a haloalkylfluorosilane, free of halogen substitution on the beta carbon atom of the haloalkyl group thereof, in a highly polar liquid organic solvent.

2. The process as claimed in claim 1 wherein the highly polar organic solvent is a dialkylacylamide.

3. The process as claimed in claim 1 wherein the highly polar organic solvent is a dialkylether of polyethyleneglycol.

4. A process as claimed in claim 1 in which the highly liquid organic solvent is a highly polar nitrogen-containing organic liquid compound.

5. A process as claimed in claim 1 wherein the reaction is conducted in the presence of a reaction promoter selected from the class consisting of sodium iodide and potassium iodide.

6. A process for producing a cyanoalkylfluorosilane which comprises reacting under essentially anhydrous conditions and in the presence of a highly polar liquid organic solvent, an ionic metal cyanide selected from the class consisting of the ionic metal cyanides of the metals of groups I and II of the periodic chart and a haloalkylfluorosilane, the beta carbon atom of the haloalkyl group of said haloalkylfluorosilane being free of halogen.

7. A process for producing a cyanoalkylfluorosilane which comprises reacting an alkaline earth metal cyanide and a haloalkylfluorosilane, free of halogen substitution on the beta carbon atom of the haloalkyl group thereof, in a highly polar liquid organic solvent.

8. The process as claimed in claim 7 wherein the highly polar organic solvent is a dialkylacylamide.

9. The process as claimed in claim 7 wherein the highly polar organic solvent is a dialkylether of polyethyleneglycol.

10. A process as claimed in claim 7 in which the highly liquid organic solvent is a highly polar nitrogen-containing organic liquid compound.

11. A process as claimed in claim 7 wherein the reaction is conducted in the presence of a reaction promoter selected from the class consisting of sodium iodide and potassium iodide.

12. A process for producing a cyanoalkylfluorosilane which comprises reacting an alkali metal cyanide and a haloalkylfluorosilane, free of halogen substitution on the beta carbon atom of the haloalkyl group thereof, in a highly polar liquid organic solvent.

13. The process as claimed in claim 12 wherein the highly polar organic solvent is a dialkylacylamide.

14. The process as claimed in claim 12 wherein the highly polar organic solvent is a dialkylether of polyethyleneglycol.

15. A process as claimed in claim 12 in which the highly liquid organic solvent is a highly polar nitrogen-containing organic liquid compound.

16. A process as claimed in claim 12 wherein the reaction is conducted in the presence of a reaction promoter selected from the class consisting of sodium iodide and potassium iodide.

17. The process of preparing gamma-cyanoisobutyl-methyldifluorosilane which comprises reacting sodium cyanide and gamma-chloroisobutylmethyldifluorosilane in the presence of N,N-dimethylformamide.

18. The process of preparing gamma-cyanoisobutyl-methyldifluorosilane which comprises reacting sodium cyanide and gamma-chloroisobutylmethyldifluorosilane in the presence of tetraethylene-glycol-dimethylether.

References Cited in the file of this patent

UNITED STATES PATENTS

| | | |
|---|---|---|
| 2,776,306 | Cole | Jan. 1, 1957 |
| 2,981,746 | Cohen et al. | Apr. 25, 1961 |

FOREIGN PATENTS

| | | |
|---|---|---|
| 1,116,726 | France | Feb. 6, 1956 |
| 534,818 | Canada | Dec. 25, 1956 |
| 553,606 | Belgium | Jan. 15, 1957 |